United States Patent Office
3,506,427
Patented Apr. 14, 1970

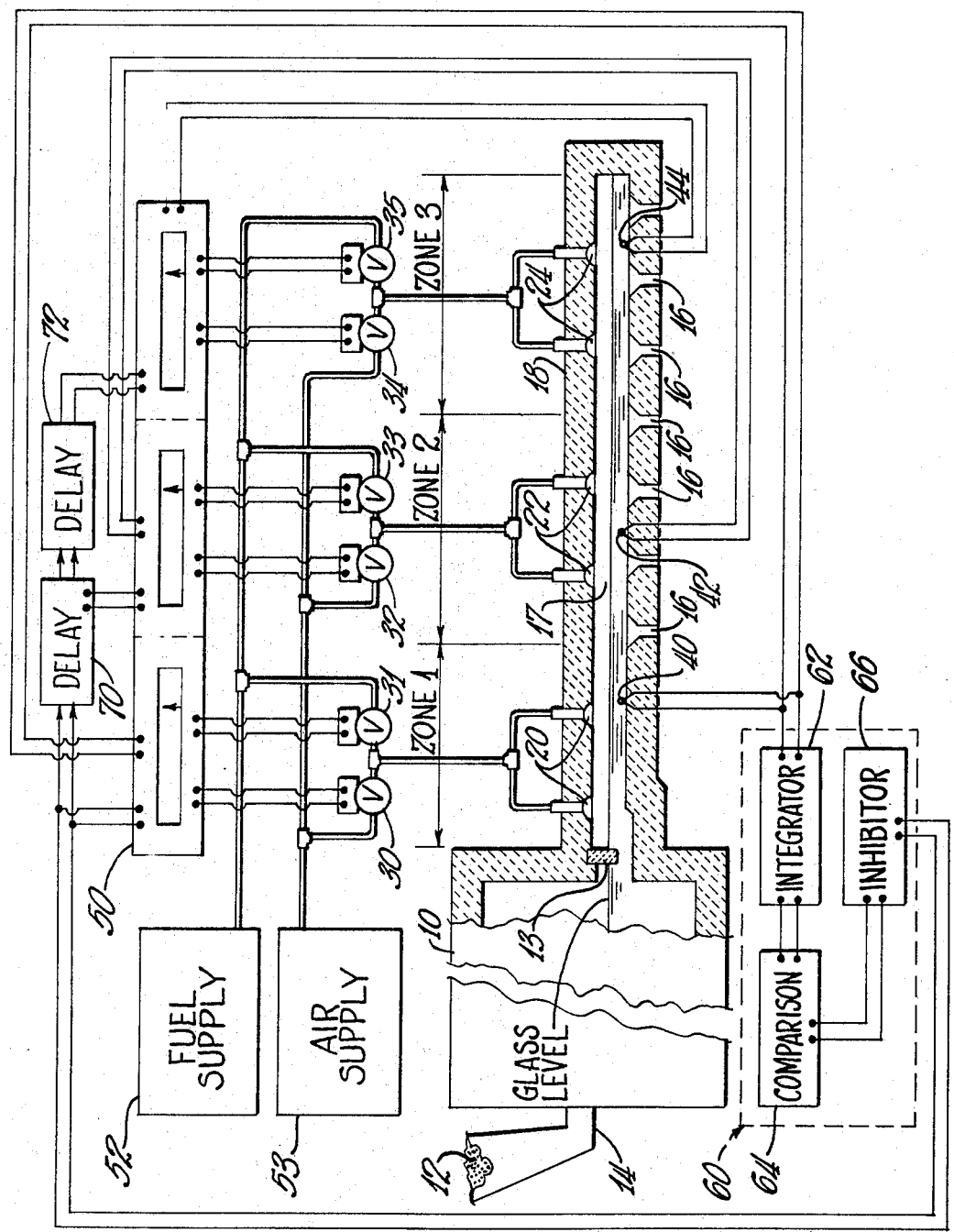

3,506,427
METHOD AND APPARATUS FOR HEAT
CONTROL AND SENSING
Paul D. Griem, Jr., Newark, Ohio, assignor to Owens-Corning Fiberglas Corporation, a corporation of Delaware
Filed Mar. 31, 1967, Ser. No. 627,401
Int. Cl. C03b 25/02; G12b 1/00
U.S. Cl. 65—162
15 Claims

ABSTRACT OF THE DISCLOSURE

Apparatus for heat treating material, such as a glass melting furnace having a forehearth for receiving material from a melting tank of the furnace, which includes a device for sensing a portion of the received material which has a substantially different temperature than the remainder of the received material, e.g. an unmelted mass. Control elements regulate the heat normally supplied in the forehearth. The sensing device modifies the regulating effect of the control elements when an unmelted mass is sensed.

---

Although this invention is applicable in other areas it will be described in detail with respect to its use in the glass processing and fiber-forming areas. It has been a practice to melt glass batch or cullet in a melting tank of a furnace and flow the molten material into a forehearth in order to supply glass in flowable condition to one or more feeders associated with the forehearth. The feeders are formed with a plurality of small openings or orifices through which streams of glass flow, as supplied by the forehearth, providing glass bodies which may be readily attenuated into fibers. The streams or glass bodies may be attenuated into fibers by various means such as by engaging hot gaseous blasts moving at high velocities with primary filaments formed from the streams or engaging the streams directly with blasts of steam or compressed air. Further, filaments or fibers may be formed through the spinner or centrifugal process. If continuous filaments or fibers are desired the streams may be attenuated by directing the filaments into contact with rapidly rotating pull or nip rolls or the filaments or strand of filaments may be rapidly wound upon a cylindrical sleeve or mandrel into package form, the winding of the strand at high speed providing the force for attenuating or drawing the streams of the filaments.

The uniformity and quality of fibers or filaments attenuated from the glass streams or primary filaments formed therefrom are, in large measure, dependent upon the homogenous character of the glass composition wherein the constituents are uniformly distributed and upon the proper control of temperature and viscosity characteristics of the glass adjacent each feeder associated with the forehearth. Arrangements of furnace and forehearth heretofore employed have certain disadvantages which have presented difficulties in maintaining satisfactory control of the homogeneity of the glass composition, viscosity and temperature characteristics in the production of filaments or fibers from several feeders disposed along the forehearth.

To promote satisfactory control of the viscosity and temperature characteristics of the glass, forehearths have been divided into a plurality of successive heating zones, each zone separately controlled by a set point controller which is responsive to a temperature sensing element located in the molten material in the zone which it is controlling. Since the temperature of the molten material in the melting tank of the furnace is on the order of 2600° F. and the proper temperature for attenuating filaments from flowing material is on the order of 2300° F., it is necessary for the forehearth to receive the glass at the higher temperature and maintain the glass in flowable condition at the desired fiber forming temperature while reducing the temperature of the glass from that in the melting tank to the desired fiber forming temperature. This is accomplished by the plurality of successive heating zones described above.

Even though most glass furnaces have skimmers located between the melting tank and forehearth sections, the skimmers erode away from age or become dislocated so that small portions, masses or islands of incompletely melted material move from the melting section into the forehearth. When this relatively cool mass of material flows from the melting tank into the first firing zone of the forehearth, the temperature sensing means of the first firing zone senses the mass and tells the first zone heating means to supply an excessive amount of heat. Such fast firing or the addition of heat necessary to melt the mass in the first zone would be excessive and thermally disruptive of the already molten material, since the heating in the forehearth zones is intended principally to provide stability in temperature for glass which has already been melted, rather than to require that the heating means in the first zone melt any cool masses accidentally entering the forehearth. Similarly, disruptions would occur in successive zones as the cool mass or incompletely melted mass passes along the length of the forehearth. It would thus be desirable that the fast firing controls or the signal to provide excessive additional heat in response to the entry of an incompletely melted mass into a first zone be squelched or inactivated when such cool mass is in the forehearth.

Accordingly, it is an object of this invention to provide an improved method and apparatus for heat treating material.

A further object of this invention is to provide an improved method of and apparatus for processing heat-softenable materials, particularly in the forehearth section of a glass or mineral material handling furnace.

It is a further object of this invention to provide an improved method of and apparatus for avoiding disruption of zonal temperature and viscosity controls in forehearths of furnaces for handling heat-softenable materials.

To carry out the above objects the invention features apparatus for heat treating material which includes a heating unit having a material inlet means and a material exit means, the heating unit having a heating zone between the inlet means and the exit means for heating the material. The zone has a heating means and means for sensing the temperature of the material in the zone. Control means, responsive to the temperature sensing means, regulates the amount of heat supplied in the zone by the heating means. Means responsive to a predetermined change in temperature of the material in the zone is operative to modify the regulating effect of the control means for the zone. The modifying means may be made operative to prevent the control means from reacting to a relatively minor portion of the material in the zone, which portion has a temperature substantially different from the remainder of the material. The heating unit may have a plurality of heating zones between the inlet and the exit with each of the zones having a heating means regulated by the control means. The modifying means may then be responsive to the predetermined temperature change mentioned above in a zone adjacent to the inlet means and may provide a signal to modify the regulating effect of the control means on the heating means for the adjacent zone. The modifying means may be made operative to prevent the control means from reacting in zones successive to the adjacent zone as the minor portion moves through the successive zones. In the specific embodiment of the invention disclosed herein the heating unit is a forehearth adapted to receive material from a melting tank of a furnace. The heating means comprises burner means and the control means regulates flow of fuel to the burner means. The modifying means herein provides a signal operative to enable the control means to hold the flow of fuel at its last regulated position during the predetermined temperature change.

The invention also features the method of processing heat-softenable material which includes the steps of passing the material through a heating unit having a plurality of heating zones, sensing the temperature of the material in each zone, supplying heat to each zone in response to the sensed temperature of the material in that zone, detecting a predetermined temperature change in the material in a first of the zones, and maintaining the heat supplied to the first zone at the same level as that supplied before the detection of the predetermined temperature change. The method may include the further step of returning control of the heat supplied to the first zone to the sensed temperature of that zone after the predetermined temperature change has subsided. The method may also include the step of successively maintaining heat supplied to successive zones at predetermined levels after the step of maintaining the heat supplied to the first zone at the pre-detection level.

More specifically there is disclosed and featured herein a method of controlling a forehearth having a plurality of heating zones and adapted to receive heat-softenable material from a melting tank of a furnace comprising the steps of sensing the temperature in the molten material in each of the zones, supplying heat to each zone in response to the temperature sensed in the molten material in the zone, detecting an unmelted portion of the material in a first of the zones that will interfere with sensing of temperature in the molten material in the first zone, and maintaining the heat supplied to the first zone at the level supplied just prior to the detection of the unmelted portion in the first zone. This method may further include the step of returning control of the heat supplied to the first zone to the temperature sensed in the molten material in the first zone after the unmelted portion leaves the first zone. This method may further include the step of holding the amount of heat supplied in successive zones at a level supplied prior to entry into each zone of the unmelted portion until the unmelted portion passes through each zone. The method may also include an additional step of utilizing the detection of the unmelted portion in the first zone to provide a signal delayed in proportion to the rate of flow of the material through said zones to initiate the holding step in successive zones. Further, the detection signal may be utilized on a delayed basis to terminate the holding step in successive zones.

Other objects, features, and advantages will become apparent when the following description is taken in conjunction with the accompanying drawing, in which, a semidiagrammatic view illustrating one form of the teachings of this invention is shown in the drawing.

As the method and apparatus of the invention have particular utility with a furnace or equipment utilized for melting glass or other heat-softenable mineral material to utilize the glass or similar material for forming fibers or filaments, a melting furnace and forehearth of this character is illustrated in conjunction with the apparatus.

In the drawing there is illustrated a melting tank or furnace 10 constructed of refractory material which is adapted to receive glass batch or cullet 12 through a material receiving section or inlet 14. The furnace 10 may be fired by a plurality of fuel gas or oil burners (not shown) to a temperature rendering the glass batch or cullet molten and flowable. As indicated in the drawing the raw batch material or cullet is introduced at the rear end of an elongated furnace 10, the material in molten condition flowing forwardly or generally lengthwise of the furnace, and is mixed and fined as it flows through the furnace to and through a forehearth 18.

The glass or other molten material in the forehearth 18 may be delivered from the forehearth in any desired manner, such as through forehearth exits 16 to one or more feeders (not shown), each provided with a plurality of openings or orifices for flowing glass streams adapted to form primary filaments or bodies which are adapted to be delivered or fed to an attenuating means. The forehearth 18 may be divided into a plurality of successive heating zones to further fine the molten material and to bring the molten material to and maintain the material at a desired predetermined fiber-forming temperature.

In FIGURE 1 the forehearth is divided into zones 1, 2 and 3, each having one or more heating or burner means 20, 22, 24, respectively. The plurality of heating means may be in the form of radiant heaters or burners which are mounted lengthwise of the forehearth 18 in the upper wall or ceiling above the glass receiving channel 17, each of the burners being supported in blocks of the refractory material forming the forehearth. The heating units may be of the so called radiant type adapted to burn a mixture of gaseous fuel and air, the combustion taking place in the recesses formed in the upper wall adjacent the nozzle portions of the burners and also taking place in the space between the surface of the molten glass in the channel 17 and the upper wall.

The burners in each zone are provided with supply pipes connected to independently operable valves 30 and 31, 32 and 33, 34 and 35, respectively, for regulating the mixture of fuel and combustion air supplied to the individual burners thereby enabling accurate and precise temperature control of the various zones in the forehearth section 18. By this means temperature regulation may be had over the entire length of the glass channel 17 in the forehearth section 18, providing accurate control over the viscosity of the glass or other material contained in the forehearth section 18. Temperature sensing means such as thermocouples 40, 42, 44, respectively, are provided to sense the temperature in the molten material in each of the zones 1, 2 and 3. A signal proportional to the temperature sensed by each thermocouple is supplied to a controller 50 having three sections for controlling each of the three zones, or may be supplied to a controller individual to each zone. The burner means 20, 22, 24 are supplied fuel from a fuel supply 52 via control valves 31, 33, 35, respectively. Combustion air from an air supply 53 is supplied through control valves 30, 32, 34, respectively, to the burner means 20, 22 and 24.

Each section of the controller 50 may be of any suitable type well known in the prior art which is operative to control valves 30 through 35 to supply combustion air and fuel to burners 20, 22 and 24 in an amount necessary to bring the molten material to and/or maintain the material at a temperature determined by the selected set points of the various sections of the controller. The rate at which combustion air is delivered to the burners 20, 22, 24 may be controlled by the valves 30, 32 and 34 which is regulated by the three sections of the controller 50. Similarly, the controller regulates the flow of fuel from fuel supply 50 through valves 31, 33 and 35. The controller 50 may open or close air supply valves 30, 32 and 34 in response to decreases or increases, respectively, in the temperature as indicated by the thermocouples 40, 42 and 44 in the glass melt and may proportion the rate of flow of gas or other fuel from supply 52 to the rate of air flow. Alternatively, the controller 50 may open or close the fuel supply valves 31, 33 and 35 in response to decreases or increases, respectively, in a temperature as indicated by thermocouples 40, 42 and 44 and proportion the rate of flow of combustion air through the flow regulating valves 30, 32 and 34 in proportion to the fuel flow through the valves 31, 33 and 35.

The control means just described is operative to provide molten material at predetermined temperatures to feeders or other end uses under normal operating conditions. However, if a cool mass of material such as an incompletely melted mass or island of batch or cullet flows from a tank 10 into the forehearth 18 the control operation as just described is upset. A skimmer block 13 is disposed in the channel of the connecting neck between the tank 10 and the forehearth 18. However, the skimmer block may erode or become misplaced or otherwise allow incompletely melted masses into the forehearth 18. In response to the appearance of the relatively cool mass of material in zone number 1 the thermocouple 40 will sense a reduced temperature, either because the shadow of the island will obscure the radiant heat supplied by the burners 20 or because the relatively cool mass is of sufficient size to affect the average temperature of the molten material 40. The thermocouple 40 thus provides a signal to the first section of the controller 50 which is operative to open valve 31 and increase the firing rate of the burners 20. The fast firing necessary to melt the mass in the first zone would be excessive and thermally disruptive, since the firing in each of the zones is intended principally to provide stability in the temperature for the glass which has already been melted. Similarly, as the incompletely melted mass passes through successive zones 2 and 3 thermocouples 42 and 44 would provide signals to increase the heat supplied to the zones 2 and 3, which again would be thermally disruptive.

In order to avoid the thermal disruption occurring from such incompletely melted masses of material the zone adjacent to the melting tank of the furnace or the first zone is provided with a means for detecting the presence or arrival of such masses. In the specific embodiment shown in FIGURE 1 an analyzer section 60 is connected to sample the signals received from thermocouple 40. The analyzer 60 may be a computer which measures the temperature sensed by thermocouple 40 at periodic intervals, for example every two seconds. The computer then may add the temperature changes until a predetermined level is reached and provide a signal to the first section of the controller 50 to hold the amount of heat being supplied to the first zone to that being supplied prior to the entry or detection of an incompletely melted mass of material. Alternatively, the analyzer or computer 60 may measure the rate of change of the temperature sensed by thermocouple 40 and provide a modifying signal to the first section of controller 50 in response to the detection of a predetermined rate of change.

As an alternative to the use of built-in circuits of a computer, an anlyzer 60 may be utilized to detect a rate of change of temperature from thermocouple 40 or to act as a build-up or summing device for temperature changes sensed by thermocouple 40. The rate of change or the sum of the amount of change as measured by the integrator 62 may be compared with a predetermined rate of change or sum or amount set in comparison circuit 64. The comparison circuit 64 may be connected to an inhibitor circuit 66 which will inhibit the transmission of a modifying signal to the first section of the controller 50 unless the sum or total amount or unless the rate of temperature change is equal to or within a predetermined tolerance of a predetermined sum or amount or predetermined rate of change programmed in the comparison circuit. Thus the built-in circuits of a computer or the integrator-comparison-inhibitor circuit arrangement of the analyzer 60 may be utilized to detect an incompletely melted mass of material in the first zone of the forehearth 18 and override the control normally supplied by thermocouple 40 to the first section of the controller 50 to prevent a thermal disruption in zone 1 of the forehearth 18.

The analyzer or computer 60 may be set so that a modifying signal will be transferred to the controller in response only to those rates of change or total amounts of change corresponding to a mass of material which is of sufficient size to cause the thermocouple 40 to thermally disrupt zone 1 of the forehearth. Any rapid or relatively short time changes effected by very small masses of incompletely melted material or from transients within the circuit may be allowed to pass without modifying the action of the first section of the controller 50.

When the incompletely melted mass of material passes from a point of influence with respect to thermocouple 40 a reverse change in temperature or rate of change will occur which may be again detected by the analyzer circuit 60 which will provide a signal to the first section of the controller 50 to return the control of the burner or heating means 20 directly to the temperature sensing thermocouple 40.

The signal supplied from analyzer circuit 60 may also be utilized to effect a holding action on the burner means 22 and 24 of zones 2 and 3. The signal from analyzer 60 is fed through a delay circuit 70 to the second section of the controller 50. The delay set in the circuit 70 should correspond to that required for the rate of flow of the material within the forehearth to carry the incompletely melted mass or island of material through the second zone of the forehearth 18. A further delay circuit 72 may be connected to receive the signal either from analyzer 60 or from the delay circuit 70 to provide a holding action of the burner control in the third section of the controller 50. Similarly, the delay set in delay circuit 72 advantageously will be that required for the island or mass of incompletely melted material to enter and pass through zone 3. In the overwhelming number of instances it is anticipated that within the total sequential inactivation or holding time the island of glass will have melted and the regular control function can be returned to the respective zone of controls without instability occurring.

Under experimental conditions a fast change in the temperature in the first zone, upon being sensed, is utilized to indicate the presence of a relatively unmelted mass flowing into the forehearth. A computer or analyzer responds to the rapid temperature reduction as sensed by the thermocouple 40 by inactivating or maintaining the controls for the heating means at a predetermined level to avoid otherwise raising the temperature in the forehearth to an undesirably large thermal disrupting value. The period of inactivation or holding corresponds to the time which it would take for this type of mass to flow through the first zone whereupon the controls in the first zone are returned to their normal function while the controls of the second zone are similarly inactivated or held at a predetermined position for a corresponding period of time. Likewise sucessive zones are successively inactivated, maintained or held at a predetermined position when the controls for the preceding zone are returned to their normal functions.

In actual practice before the first zone controls are fully inactivated or held at predetermined level the temperature in the first zone raises slightly a few degrees before the computer or analyzer has an opportunity to be sure that the cool mass is of the type that should be treated in a special manner. This rise is not considered detrimental to the overall functioning of the forehearth but may be considered an advantage in assisting melt down of the cool mass. However, if its is desired to avoid the slight temperature rise of a few degrees while the mass is passing through the first zone the detecting signal may be also utilized to cut back the control for the burner means in the first zone an amount to offset the temperature rise already effected before the overriding control circuits take effect. The controls as illustrated herein for overriding the normal control exercise by thermocouples 40, 42, and 44 are arranged not to provide a modifying signal in response to shut down and start up of production since those temperature changes are relatively gradual in the forehearth and the analyzer or computer is arranged to sense only the rapid changes effected by rapidly cooled material passing through a zone. The control arrangement herein provides savings in production time since it allows more total production time because of fewer breakouts in fiber-forming processes as the result of glass being in an excessively heated condition. Further, the control arrangement herein enables the maintenance of more rapid and accurate control of the viscosity and temperature characteristics of the molten material in the forehearth and thus throughout the entire processing and fiber-forming operation.

It is to be noted that while the control illustrated herein is operable with a glass or other heat-softenable material melting furnace and forehearth that such controls are also operable with other heat treating methods and apparatus. For example, the controls could be utilized to effect a more even heating and curing of strips of material having irregularly occurring portions which contain substantially increased or decreased masses or masses of a material not requiring the same heat treatment as the carrier to which they are attached. Thus the increased and decreased irregularly occurring masses could be detected as shown herein and a signal from said detection utilized to override the normal controls for supplying heat to the process.

I claim:

1. Apparatus for heat treating material comprising a heating unit having a material inlet means and material exit means, said heating unit having a heating zone between said inlet means and said exit means for heating said material, said zone having a heating means, means for sensing the temperature of said material in said zone, control means responsive to said temperature sensing means for regulating the amount of heat supplied in said zone by said heating means, means for detecting a predetermined change in the temperature sensed by said temperature sensing means, and means responsive to said detecting means for inhibiting the regulating effect of said control means for said zone, said inhibiting means preventing said control means from reacting to a relatively minor portion of the material in said zone having a temperature substantially different from the remainder of the material.

2. Apparatus as defined in claim 1 in which said heating unit is a forehearth adapted to receive molten material from a melting tank of a furnace, in which said heating means comprises burner means and in which said control means regulates the heat supplied by said burner means.

3. Apparatus as defined in claim 2 in which said inhibiting means provides a signal to enable said control means to hold said heating means at its last regulated position during said predetermined temperature change.

4. Apparatus for processing heat-softenable material comprising a forehearth for receiving at an inlet said material from a melting tank of a furnace, said forehearth having a plurality of successive heating zones, each of said zones having a heating means, means for sensing the temperature of said material in each of said zones, control means responsive to said temperature sensing means of said material in each zone for regulating the amount of heat supplied by said heating means to each zone, means for detecting in a zone adjacent said inlet means a portion of material having a temperature substantially different from the remainder of said material in said adjacent zone, said portion having sufficient mass to substantially affect the temperature sensed by the temperature sensing means of said adjacent zone, said detecting means providing a signal to said control means to hold the amount of heat supplied to said adjacent zone to its last regulated amount until said portion passes through said adjacent zone.

5. Apparatus as defined in claim 4 in which said control means is operative to hold the amount of heat supplied to successive zones at their last regulated amounts as said portion passes through said successive zones.

6. Apparatus as defined in claim 4 in which said detecting means comprises means for sensing a predetermined temperature change in said adjacent zone.

7. Apparatus as defined in claim 4 in which said detecting means comprises means for sensing a predetermined rate of change of temperature in said adjacent zone.

8. A method of processing heat-softenable material comprising the steps of passing said material through a heating unit having a plurality of heating zones, sensing the temperature of said material in each zone, supplying heat to each zone in response to the sensed temperature of the material in that zone, detecting a predetermined temperature change in the material in a first of said zones, and maintaining the heat supplied to said first zone at the same level as that supplied before the detection of said predetermined temperature change.

9. A method as defined in claim 8 which further includes the step of returning control of the heat supplied to said first zone to the sensed temperature of that zone after said predetermined temperature change has subsided.

10. A method as defined in claim 9 which further includes the step of successively maintaining the heat supplied to successive zones at predetermined levels after the step of maintaining the heat supplied to said first zone at said pre-detection level.

11. A method of controlling a forehearth having a plurality of heating zones and for receiving heat-softenable material from a melting tank of a furnace comprising the steps of sensing the temperature in the molten material in each of said zones, supplying heat to each zone in response to the temperature sensed in the molten material in said zone, detecting an unmelted portion of said material in a first of said zones that will interfere with sensing of temperature in said molten material in said first zone, and maintaining the heat supplied to said first zone at the level supplied just prior to the detection of said unmelted portion in said first zone.

12. A method as defined in claim 11 which further includes the step of returning control of the heat supplied to said first zone to the temperature sensed in said molten material in said first zone after said unmelted portion leaves the first zone.

13. A method as defined in claim 12 which further includes the step of holding the amount of heat supplied in suucessive zones at a level supplied prior to entry into each zone of said unmelted portion until said unmelted portion passes through each zone.

14. A method as defined in claim 13 which further includes the step of utilizing the detection of said unmelted portion in said first zone to provide a signal delayed in proportion to the rate of flow of said material through said zones to initiate the holding step in successive zones.

15. A method as defined in claim 14 which further includes the step of utilizing said detection signal on a delayed basis to terminate the holding step in successive zones.

References Cited

UNITED STATES PATENTS

| | | | |
|---|---|---|---|
| 2,491,606 | 12/1949 | Dickey et al | 65—29 XR |
| 3,047,647 | 7/1962 | Harkins et al. | 65—162 XR |
| 3,129,087 | 4/1964 | Hagy | 65—162 |
| 3,321,288 | 5/1967 | Griem | 65—162 XR |

ARTHUR D. KELLOGG, Primary Examiner

J. H. HARMAN, Assistant Examiner

U.S. Cl. X.R.

65—29, 158